United States Patent

Shibayama et al.

[11] Patent Number: 4,832,549
[45] Date of Patent: * May 23, 1989

[54] ROTARY WELDING MEMBER MADE OF RESIN

[75] Inventors: Teruji Shibayama; Yoshio Kaneko, both of Yokohama, Japan

[73] Assignee: Nifco, Inc., Yokohama, Japan

[*] Notice: The portion of the term of this patent subsequent to Apr. 25, 2006 has been disclaimed.

[21] Appl. No.: 76,571

[22] Filed: Jul. 22, 1987

[30] Foreign Application Priority Data

Jul. 23, 1986 [JP] Japan .................. 61-173127

[51] Int. Cl.$^4$ .......................... F16B 37/06
[52] U.S. Cl. ...................... 411/171; 156/73.5; 411/2; 411/82
[58] Field of Search ............ 411/171, 82, 2, 258, 411/908; 156/73.5, 295, 303.1

[56] References Cited

U.S. PATENT DOCUMENTS

| 3,378,972 | 4/1968 | Stanley | 411/82 X |
| 4,551,189 | 11/1985 | Peterson | 411/82 X |
| 4,556,924 | 1/1986 | Hara et al. | 156/735 |
| 4,636,124 | 1/1987 | Gugle et al. | 411/82 |
| 4,676,707 | 6/1987 | Cearlock et al. | 411/82 X |

FOREIGN PATENT DOCUMENTS

| 3501715 | 7/1986 | Fed. Rep. of Germany | 156/73.5 |
| 57-36131 | 8/1982 | Japan | . |
| 60-155654 | 5/1985 | Japan | . |
| 60-62613 | 10/1985 | Japan | . |

Primary Examiner—Neill R. Wilson
Assistant Examiner—Curtis B. Bueske
Attorney, Agent, or Firm—Schwartz & Weinrieb

[57] ABSTRACT

A rotary welding member made of synthetic resin material comprising a post portion, and a disk-shaped flange portion integrally mounted on one end of the post portion and having a plurality of through holes in the direction of wall thickness thereof for the dissipation of an excessive portion of frictional heat generated during a rotary welding process whereby deleterious or degrading effects upon a base plate, to which the rotary welding member is welded, are effectively prevented.

19 Claims, 4 Drawing Sheets

FIG.I
PRIOR ART
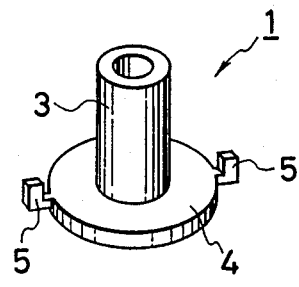
FIG.2
PRIOR ART
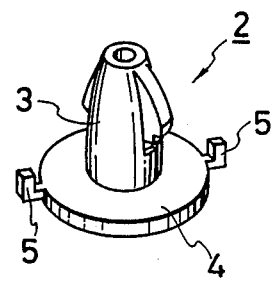
FIG.3
PRIOR ART
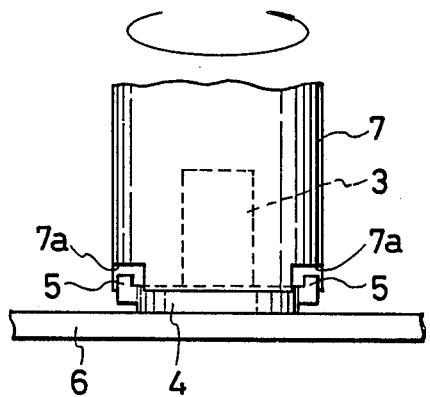

ROTARY WELDING MEMBER MADE OF RESIN

FIELD OF THE INVENTION

This invention relates to a rotary welding member made of a resin material for welding to a synthetic resin surface by means of frictional heat caused by pressing and rotating the rotary welding member upon the synthetic resin surface.

BACKGROUND OF THE INVENTION

Various kinds of rotary welding members made of synthetic resin material of the type mentioned above have been proposed (for example, Japanese Patent Publication No. SHO 57-36131, and Japanese Utility Model Public Disclosure Nos. SHO 60-62613 and 60-155654).

A conventional welding member made of resin for being rotated and welded to a resin surface such as, for example, a stud 1 (FIG. 1) and fastener 2 (FIG. 2) usually has such a structure as that of a post portion 3 which is provided with a disk-shaped flange portion 4 mounted upon one end thereof, and the flange portion 4 is provided with engaging projections 5 projecting from the peripheral portion of the flange portion 4 at opposite sides of a welding surface thereof.

In order to mount this member made of resin on a mounting base plate made of resin, the stud 1 or the fastener 2 is, as is shown in FIG. 3, held and pressed at the desired position on a mounting base plate 6 made of resin by means of rotary jig 7, and a cut-out section 7a of the rotary jig 7 is engaged with each engaging projection 5 and rotated at a high rate of speed (FIG. 3). Both contacting surfaces of the flange portion 4 and the mounting base plate 6 are melted by means of the frictional heat generated during such rotary welding process. After the rotation has been stopped, the melting portion cools and hardens. As a result, the stud 1 or the fastener 2 is firmly secured to the mounting base plate 6.

However, in the stud 1 or the fastener 2 system of the above-described structure, the contacting surfaces of the flange portion 4 and the mounting base plate 6 are melted by means of the frictional heat generated when the rotary welding process is performed. In addition, if the mounting base plate 6 is not thick enough, even the rear surface of the mounting base plate 6 is softened by means of this frictional heat. As a result, as is shown in FIG. 4(a), the rear surface of the mounting base plate 6 is expanded outwardly by means of the pressure of the rotary jig 7 exerted against the stud 1 or the fastener 2 for performance of the rotary welding process, or as is shown in FIG. 4(b), the rear surface of the mounting base plate 6 is warped or wrinkled because of the difference in the coefficient of contraction between the flange portion 4 and the mounting base plate 6 which are melted and welded together and then cool andharden, at different rates resulting from the difference in the coefficient of linear expansion between the flange portion 4 and the mounting base plate 6. In other words, so-called "set-off" occurs.

Because of the foregoing, in the case where the rear surface of the mounting base plate 6 constitutes an outer surface of a product, the appearance is significantly spoiled by this set-off.

OBJECT OF THE INVENTION

An object of the present invention is to provide a rotary welding member made of resin, wherein the set-off which often causes degrading of the outer appearance of a product is inhibited.

SUMMARY OF THE INVENTION

In order to achieve the above-mentioned object, in the present invention, a flange portion of a rotary welding member made of resin is formed with a plurality of through holes in the direction of the wall thickness thereof.

Since the flange portion is formed with the through holes, excessive heat generated during the rotary welding process is dissipated to the air from the through holes and does not remain in the flange portion. Since the contacting surface of the flange portion is reduced, the amount of generated frictional heat is reduced. Since air is drawn in during the rotation, the excess heat is carried away. For the foregoing reasons, the excess heat is not transferred to the rear surface of the mounting base plate and expansion of the rear surface does not occur.

Furthermore, notwithstanding any difference in the coefficient of linear expansion between the flange portion and the mounting base plate, provision of the through holes permits the flange portion to be easily deformed. As a result, since the deformation of the flange portion is readily achieved at the time of hardening and contraction by the mounting base plate, warping and wrinkling of the mounting base plate are effectively eliminated.

BRIEF DESCRIPTION OF THE DRAWINGS

The above and other objects and features of the invention will become more apparent from the following detailed description with reference to the accompanying drawings, wherein:

FIG. 1 is a perspective view showing a stud as one example of a conventional rotary welding member made of resin;

FIG. 2 is a perspective view showing a fastener as another exampleof a conventional rotary welding member made of resin;

FIG. 3 is a schematic view showing the welding operation using the above-mentioned stud;

DETAILED DESCRIPTION OF THE PREFERRED EMBODIMENTS

Figure 4A:
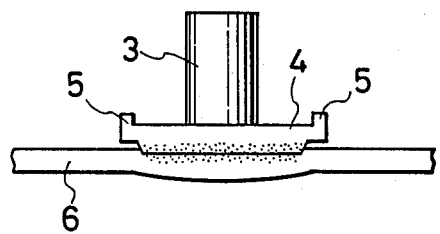
FIGS. 4(a) and 4(b) are schematic views showing states in which set-off occurs when the welding member is mounted upon the base plate.
Figure 4B:
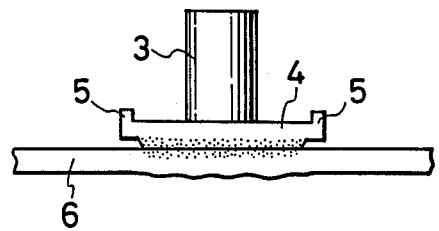
Figure 5:
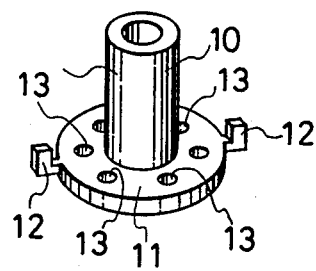
FIG. 5 is a perspective view showing a stud as one example of a rotary welding member made of resin according to the present invention.

FIG. 5 illustrates a stud as one example of a rotary welding member made of synthetic resin according to the present invention. In the figure, the welding member is integrally molded of synthetic resin and comprises a cylindrical post portion 10, a disk-shaped flange portion 11 mounted upon one end of the post portion 10, and a pair of engaging projections 12 located upon the peripheral portion of the flange portion 11 and projecting away from the welding surface thereof. The flange portion 11 is formed with a plurality of round holes 13 in the direction of the wall thickness thereof.

Figure 6:
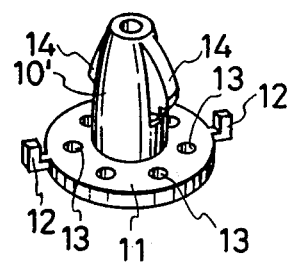
FIG. 6 is a perspective showing a fastener as another example of a rotary welding member according to the present invention.

FIG. 6 illustrates a fastener comprising a post portion 10 and a pair of elastic engaging projections 14 projecting outwardly from the post portion 10, the remainder thereof having the same structure as the stud of the embodiment of FIG. 5.

Figure 7:
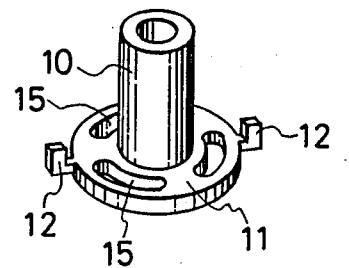
FIG. 7 is a perspective view showing another example of a stud as a welding member according to the present invention.
Figure 8:
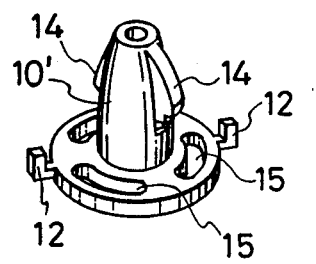
FIG. 8 is a perspective view showing another example of a fastener as a welding member according to the present invention.

FIG. 7 illustrates another example of the stud of FIG. 5, in which a plurality of holes 15 elongated in the circumferential direction are employed as the through holes of the flange portion 11, instead of round holes. FIG. 8 illustrates another example of the fastener of FIG. 6, in which a plurality of holes 15 elongated in the circumferential direction are employed instead of the round holes 13 of the flange portion 11 of FIG. 6.

Figure 9:
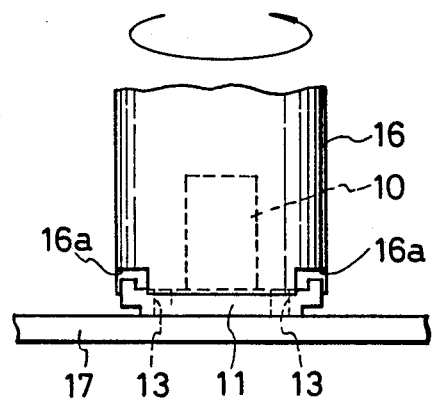
FIG. 9 is a schematic view showing the welding operation using the above-mentioned stud.
Figure 10A:
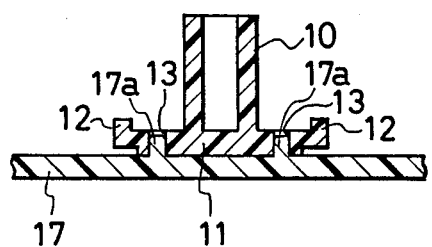
FIGS. 10(a) and 10(b) are sectional views showing states in which the welding member is mounted on a base plate.
Figure 10B:
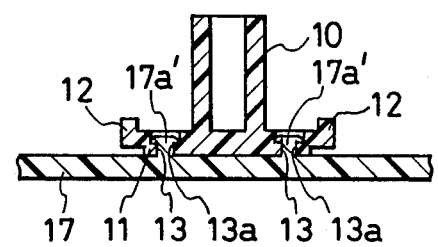

When, as shown in FIG. 9, these welding members are held with the engaging projections 12 engaged in cut-out sections 16a of a rotary jig 16 with the flange portion 11 pressed against a mounting plate 17 made of synthetic resin, and are then rotated at a high rate of speed, the contacting surfaces thereof are melted by means of frictional heat. Then when pressure is applied thereto after stopping the rotation, the flange portion 11 is welded to the mounting base plate 17 (FIG. 10). Since frictional heat generated during the rotary welding process is dissipated from the round holes 13 or the elongated holes 15, excess heat does not remain in the flange portion 11. Furthermore, since the contacting surface of the flange portion 11 is reduced because of the round holes 13 or the elongated holes 15, the amount of frictional heat generated is reduced. Moreover, since the round hols 13 or the elongated holes 15 draw in air during the rotational movement of the welding member, heat is carried away and the excessive portion of the frictional heat will not remain in the flange portion 11. Accordingly, occurrence of set-off at the rear surface of the mounting base plate 17 is inhibited and the rear surface of the mounting base plate 17 is not expanded outwardly as in the case with conventional rotary welding members.

Furthermore, in spite of the presence of a difference in the coefficient of linear expansion between the flange portion 11 and the mounting base plate 17, since the round holes 13 or the elongated holes 15 help the flange portion 11 to be readily deformed and the deformation of the flange portion is readily achieved by means of the mounting base plate 17 when hardened and contracted, the occurrence of the set-off and the generation of warpage and wrinkling at the rear surface of the mounting base plate 17 becomes less.

Furthermore, since the melted portion 17a of the mounting base plate 17 enters the round holes 13 or the elongated holes 15 of the flange portion 11 and is hardened therein during the welding process, the flange portion 11 can be more firmly secured to the mounting base plate 17. In view of the foregoing, if the round holes 13 (or the elongated holes 15) are ach provided with a stepped portion 13a as show in FIG. 10(b), the mounting base plate 17 is engaged with the stepped portion 13a when the melted portion 17a has hardened. Thus, the flange portion 11 can be more firmly secured to the mounting base plate 17.

The configurations of the through holes of the flange portion 11 are not limited to the ones shown in FIG. 5 and FIG. 7. Instead, they may take any desired configuration.

As described in the foregoing, the rotary welding member made of resin according to the present invention is constructed in such a manner as to enhance the heat dissipation effect. Accordingly, the occurrence of the set-off at the rear surface of the mounting base plate can be reduced.

In addition, since the melted portion of the mounting base plate enters the through holes and is hardened therein, firmer mounting of the welding member upon the base plate 17 can be realized.

Obviously, many modifications and variations of the present invention are possible in light of the above teachings. It is therefore to be understood that within the scope of the appended claims, the present invention may be practiced otherwise than as specifically described herein.

What is claimed is:

1. A rotary welding member integrally molded of synthetic resin material, comprising:
   a post portion;
   a disk-shaped flange portion integrally mounted upon one end of said post portion;
   means mounted upon said rotary welding member for enabling high-speed rotation of said rotary welding member by means of a high-speed rotating tool;
   said disk-shaped flange portion having a surface to be friction welded to a substrate as a result of partial melting of said surface of said disk-shaped flange portion in response to heat generated between said surface of said disk-shaped flange portion and said substrate as a result of friction developed between said surface of said disk-shaped flange portion and said substrate during said high-speed rotation of said welding member by said high-speed rotating tool while in contact with said substrate; and
   a plurality of apertures defined within said disk-shaped flange portion and extending therethrough for permitting atmospheric air to flow through said apertures whereby an excessive portion of said generated heat is dissipated so as to prevent deterioration of said substrate.

2. The welding member as claimed in claim 1, wherein said apertures are round.

3. The welding member as claimed in claim 1, wherein said apertures are elongated in the circumferential direction.

4. A rotary welding member aa set forth in claim 1, wherein:
   said rotary welding member comprises a stud.

5. A rotary welding member as set forth in claim 1, wherein:
   said rotary welding member comprises a fastener.

6. A rotary welding member as set forth in claim 2, wherein:
   said rotary welding member comprises a stud.

7. A rotary welding member as set forth in claim 2, wherein:
   said rotary welding member comprises a fastener.

8. A rotary welding member as set forth in claim 3, wherein:
   said rotary welding member comprises a stud.

9. A rotary welding member as set forth in claim 3, wherein:
said rotary welding member comprises a fastener.

10. A rotary welding member as set forth in claim 1, wherein:
said high-speed rotational enabling means are mounted upon said disk-shaped flange portion of said rotary member.

11. A rotary welding member as set forth in claim 10, wherein:
said high-speed rotational enabling means are mounted upon exterior peripheral portions of said disk-shaped flange portion of said rotary welding member.

12. A rotary welding member as set forth in claim 11, wherein:
said high-speed rotational enabling means comprises a pair of diametrically opposed projections.

13. A rotary welding member as set forth in claim 12, wherein:
said projections extend away from said surface of said disk-shaped flange portion which is friction welded to said substrate.

14. A rotary welding member as set forth in claim 13, wherein:
said rotary welding member comprises a stud.

15. A rotary welding member as set forth in claim 13, wherein:
said rotary welding member comprises a fastener.

16. A rotary welding member as set forth in claim 2, wherein:
each of said apertures extending through said disk-shaped flange portion has a stepped configuration whereby upon completion of said frictional welding together of said disk-shaped flange portion of said rotary welding member and said substrate, portions of said substrate can engage said stepped portions of said apertures so as to firmly secure said rotary welding member to said substrate.

17. A rotary welding member as set forth in claim 3, wherein:
each of said apertures extending through said disk-shaped flange portion has a stepped configuration whereby upon completion of said frictional welding together of said disk-shaped flange portion of said rotary welding member and said substrate, portions of said substrate can engage said stepped portions of said apertures so as to firmly secure said rotary welding member to said substrate.

18. A rotary welding member as set forth in claim 2, wherein:
said plurality of apertures are equiangularly disposed about a longitudinal axis of said rotary welding member.

19. A rotary welding member as set forth in claim 3, wherein:
said plurality of apertures are equiangularly disposed about a longitudinal axis of said rotary welding member.

* * * * *